United States Patent [19]
Reymanandt, IV

[11] Patent Number: 5,555,852
[45] Date of Patent: Sep. 17, 1996

[54] ALCOHOL INJECTION SYSTEM AND METHOD FOR INTERNAL COMBUSTION ENGINES

[76] Inventor: Louis D. Reymanandt, IV, 590 11th Ave., Vero Beach, Fla. 32962

[21] Appl. No.: 509,512

[22] Filed: Jul. 31, 1995

[51] Int. Cl.$^6$ ............................................. F02M 17/22
[52] U.S. Cl. ................................. 123/1 A; 123/522
[58] Field of Search .......................... 123/522, 1 A, 123/3

[56] References Cited

U.S. PATENT DOCUMENTS

| | | | |
|---|---|---|---|
| 3,931,801 | 1/1976 | Rose et al. | 123/522 |
| 4,011,847 | 3/1977 | Fortino | 123/522 |
| 4,175,525 | 11/1979 | Johnson | 123/522 |
| 4,216,751 | 8/1980 | Davison et al. | 123/523 |
| 4,323,046 | 4/1982 | Barber | 123/1 A |
| 4,403,576 | 9/1983 | Dimitroff et al. | 123/1 A |

FOREIGN PATENT DOCUMENTS 63-248960  10/1988  Japan ................................. 123/522

*Primary Examiner*—David A. Okonsky
*Attorney, Agent, or Firm*—Carroll F. Palmer

[57] ABSTRACT

A method for improving economy and performance in the operation of internal combustion engines of motor vehicles includes the steps of (a) providing on the motor vehicle a confined supply of alcohol, (b) pressurizing the confined supply of alcohol with engine exhaust gases, (c) passing a controlled stream of alcohol from the confined supply to an enclosure defining an upper zone and a lower zone to maintain a volume of liquid alcohol in the lower zone, (d) charging a stream of air into the volume of the alcohol to vaporize a portion thereof and form vaporized alcohol in the upper zone, (e) causing pressure contained within the enclosure to discharge a stream of the vaporized alcohol from the upper zone of the enclosure into the air intake manifold of the engine, (f) baffling the stream in its passage from the enclosure to the air intake manifold and (g) causing the stream of the vaporized alcohol to mix with the air passing in the manifold for subsequent mixture with the primary gasoline fuel. An improved engine fuel supply system for carrying out the method is disclosed.

13 Claims, 1 Drawing Sheet

ALCOHOL INJECTION SYSTEM AND METHOD FOR INTERNAL COMBUSTION ENGINES

BACKGROUND OF THE INVENTION

1. Field of the Invention

This application relates to improving economy and performance in the operation of internal combustion engines. More particularly, it concerns improvements in alcohol injection systems and methods for internal combustion engines, especially those used to power motor vehicles.

2. Description of the Prior Art

There is a constant demand for improving the performance of internal combustion engines to increase efficiency of operation and, particularly in motor vehicles, to increase the mileage obtained per quantity of fuel used. Numerous approaches to meeting this challange have been tried, e.g., combustion chamber redesign, valve restructuring, and like revisions of the motor mechanisms.

One frequent other approach to improvement is to modify the fuel charge to internal combustion engines rather than changing the engines per se. One path in such approach has been to inject various supplements into the conventional primary fuel stream of vaporized gasoline. Such supplements have included ammonia (see U.S. Pat. No. 4,750,453), detergent oils (see U.S. Pat. Nos. 2,687,711 & 4,170,960), alcohols (see U.S. Pat. No. 4,342,287), water/alcohol mixtures (see U.S. Pat. Nos. 4,385,593 & 4,519,341) and water (see U.S. Pat. No. 3,865,907).

As would be expected, a wide variety of devices and methods have be devised to accomplish the injection of these supplements into the primary gasoline fuel stream as shown by the foregoing U.S. patents and numerous others including:

| | |
|---|---|
| 3,530,842 | 4,076,002 |
| 3,749,376 | 4,119,062 |
| 3,790, 139 | 4,364,370 |
| 3,875,922 | 4,374,597. |

The present invention further advances the supplement addition approach to improvement in economy and performance of internal combustion engine driven motor vehicles by new improvements in alcohol injection as a supplement to gasoline fueled internal combustion engines of both the fuel injection and carburetor types.

OBJECTS

A principal object of the invention is the provision of new improvements in alcohol injection as a supplement to gasoline fueled internal combustion engines of both the fuel injection and carburetor types.

Further objects include the provision of:

1. Improved alcohol injection systems and methods for internal combustion engines powering motor vehicles.

2. Improvement in the operation of internal combustion engines powering motor vehicles to help clean the engines and reduce the amount of environmentally damaging emissions.

3. Unique system and method for improving horsepower and torque output of internal combustion engines powering motor vehicles.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished, in part, in accordance with the invention by the provision of an improved fuel supply system for conventional internal combustion engines of motor vehicles which include an air intake manifold through which air passes to form a combustible mixture in the combustion chambers of the engine, an exhaust manifold through which combustion gases discharge from the combustion chambers of the engine and fuel charging means to charge fuel to the combustion chambers of the engine. The fuel charging means may typically be of the carburetor type or the fuel injector type. Preferably also, the air intake manifold includes a mass air flow sensor and the exhaust manifold includes an oxygen sensor.

The improved fuel supply systems of the invention comprise, in combination, (a) alcohol vaporization means, (b) air stream means, (c) a surge unit, (d) a venturi unit, and (e) an alcohol supply means, each of (a)–(e) having critical structure as disclosed infra.

The alcohol vaporization means comprises an enclosed vessel including a lower section to hold liquid alcohol, an upper section to contain alcohol vapors, a first inlet conduit to admit liquid alcohol into the lower section, a second inlet conduit to admit a stream of air into the lower section, a first outlet conduit to discharge alcohol vapors from the upper section and control means to manage the volume of liquid alcohol contained in the vessel.

The air stream means comprises a pressurized air supply device including an air inlet portion, an air outlet portion and first tubular means connecting the outlet portion to the second inlet conduit of the alcohol vaporization means.

In preferred air stream means, the first tubular means preferably includes an air filter, the pressurized air supply device is an air scoop and the first tubular means includes an air filter. Alternatively, the pressurized air supply device may be a air pump.

The surge unit comprises a baffled chamber, a third inlet conduit and a second outlet conduit. The first outlet conduit of the alcohol vaporization means is connected to such third inlet conduit for flow of vaporized alcohol from the aforesaid vessel into the surge unit.

The venturi unit comprises a fourth inlet conduit operatively connected to a discharge orifice positioned within the air intake manifold to discharge vaporized alcohol streamwise into the air which passes in such manifold and such fourth inlet conduit extends externally of the air intake manifold for connection to the second outlet conduit of the surge unit for passage of vaporized alcohol streamwise from the surge unit to the orifice.

The alcohol supply means comprises a tank, a third outlet conduit to discharge liquid alcohol from the tank operatively connected by third tubular means to the first inlet conduit to charge liquid alcohol from the tank into the vessel, a fifth inlet conduit into the tank and fourth tubular means connecting the fifth inlet conduit to the exhaust manifold to pressurize the tank with the combustion gases.

In preferred alcohol supply means, the third tubular means includes a fuel filter and the fourth tubular means includes a check valve.

The term alcohol as used in this specification and the attached claims means alcohols of the group consisting of methanol, ethanol, propyl alcohol and isopropyl alcohol, mixtures thereof and mixtures thereof with water containing at least fifty percent of the group alcohol.

The objects of the invention are further attained by the provision of a new method for improving economy and performance in the operation of an internal combustion engine of a motor vehicle which includes an air intake manifold through which air passes to form a combustible mixture in the combustion chambers of the engine, an exhaust manifold through which combustion gases discharge from the combustion chambers of the engine and fuel charging means to charge fuel to the combustion chambers of the engine.

Such new method comprises in combination the steps:

A. providing on the motor vehicle a confined supply of alcohol,
B. pressurizing the confined supply of alcohol with the combustion gases,
C. passing a controlled stream of alcohol from the confined supply to an enclosure defining an upper zone and a lower zone to maintain a volume of the alcohol in the lower zone,
D. charging a stream of air into the volume of the alcohol to vaporize a portion thereof and form vaporized alcohol in the upper zone,
E. causing pressure contained within the enclosure to discharge a stream of the vaporized alcohol from the upper zone of the enclosure through conduit means into the air intake manifold,
F. baffling the stream in its passage from the enclosure to the air intake manifold and
G. causing the stream of the vaporized alcohol to mix with the air passing in the manifold.

In preferred forms of the new method (1) during the step C, the controlled stream of alcohol is filtered, (2) the passage of the stream of alcohol from the confined supply is controlled to maintain a predetermined level of the alcohol in the lower zone of the enclosure and (3) valve means prevents combustion gases to flow from the confined supply of alcohol to the exhaust manifold.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
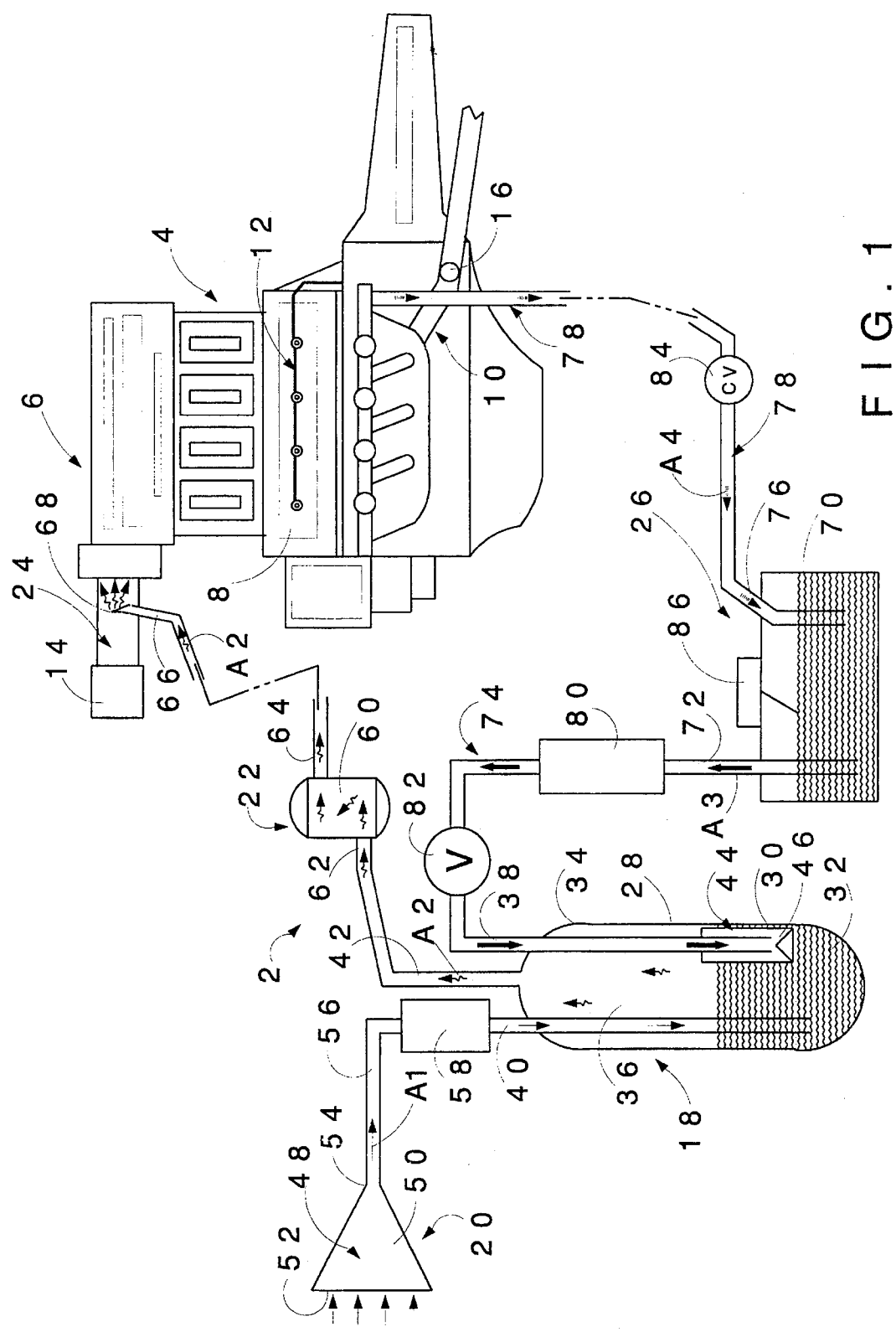
FIGURE 1 is a schematic view of an internal combustion engine improved by the addition of an alcohol injection system of the invention.

For a detailed description of the invention, reference is made to the drawings in which generic parts of the illustrated matter are indicated by arrowhead lines associated with the designation numerals and specific parts are indicated with plain lines associated with the numerals.

An improved fuel supply system 2 of the invention for conventional internal combustion engine 4 of a motor vehicle (not shown) includes an air intake manifold 6 through which air passes to form a combustible mixture in the combustion chambers 8 of the engine, an exhaust manifold 10 through which combustion gases discharge from the combustion chambers 8 of the engine 4 and fuel charging means 12 in the form of a fuel injection system to charge fuel to the combustion chambers of the engine.

The air intake manifold 6 includes a mass air flow sensor 14 and the exhaust manifold includes an oxygen sensor 16.

The improved fuel supply system 2 basically comprises alcohol vaporization means 18, air stream means 20, surge unit 22, venturi unit 24 and alcohol supply means 26.

Vaporization means 18 comprises an enclosed vessel 28 including a lower section 30 to hold liquid alcohol 32, an upper section 34 to contain alcohol vapors 36, a first inlet conduit 38 to admit liquid alcohol into the lower section 30, a second inlet conduit 40 to admit a stream of air into the lower section 30, a first outlet conduit 42 to discharge alcohol vapors 36 from the upper section 34 and control means 44 in the form of a float valve 46 to manage the volume of liquid alcohol 32 contained in the vessel 28.

The air stream means 20 comprises a pressurized air supply device 48 in the form of an air scoop 50 including an air inlet portion 52, an air outlet portion 54 and first tubular means 56 connecting the outlet portion to the second inlet conduit 40 of the alcohol vaporization means 18. The first tubular means 56 includes air filter 58 and operatively connects the means 20 with the inlet conduit 40 to force a stream of air represented by the narrowed tailed arrows A1 into the liquid alcohol 32 in vessel 28 to form the alcohol vapors 36.

The surge unit 22 comprises a baffled chamber 60, a third inlet conduit 62 and a second outlet conduit 64. The first outlet conduit 42 of the alcohol vaporization means 18 is connected to third inlet conduit 62 for flow of vaporized alcohol represented by the zig-zag tailed arrows A2 from the vessel 28 into the surge unit 22.

The venturi unit 24 comprises a fourth inlet conduit 66 operatively connected to a discharge orifice 68 positioned within the air intake manifold 6 to discharge vaporized alcohol streamwise into the air which passes in such manifold 6. Inlet conduit 66 extends externally of the air intake manifold for connection to the outlet conduit 64 of surge unit 22 for passage of vaporized alcohol streamwise to the orifice 68.

The alcohol supply means 26 comprises a tank 70, a third outlet conduit 72 to discharge liquid alcohol represented by the broad tailed arrows A3 from tank 70 operatively connected by third tubular means 74 to the first inlet conduit 38 to charge liquid alcohol from the tank into the vessel 28. A fifth inlet conduit 76 into the tank 70 and fourth tubular means 78 connects the inlet conduit 76 to the exhaust manifold 10 to pressurize tank 70 with exhaust combustion gases represented by the broken tailed arrows A4.

The third tubular means 74 includes a fuel filter 80 plus adjustable valve 82, the fourth tubular means 78 includes a check valve 84 and the tank 70 includes a fuel gauge 86.

The method of use of the fuel supply system 2 of the invention for improving economy and performance in the operation of an internal combustion engine of a motor vehicle comprises a combination steps.

Providing the motor vehicle with a confined supply of alcohol is accomplished by loading the tank 70 with alcohol.

Pressurizing such confined supply of alcohol is accomplished with combustion gases exiting the engine 4 passing via line 78 and conduit 76 into the tank 70.

Passing a controlled stream A3 of alcohol from the confined supply in tank 70 to an enclosure 28 defining an upper zone 34 and a lower zone 30 to maintain a volume of liquid alcohol 32 in the lower zone 30 proceeds via conduit 72, filter 80, line 74, valve 82, conduit 38 and level control valve 46.

Charging a stream A1 of air into the volume of alcohol 32 to vaporize a portion thereof and form vaporized alcohol 36 in upper zone 34 proceeds by air entering end 52 of air scoop 50 and then via line 56, filter 40 and conduit 40 into the alcohol 32 in the lower zone 30 of the enclosure 28.

Pressure contained within enclosure 28 causes a stream A2 of vaporized alcohol to discharge from upper zone 34 of enclosure 28 through conduit 42, line 46, conduit 66 and venturi nozzle 68 into air intake manifold 24.

Baffling the stream A2 is accomplishe by baffled tank 60 in its passage from enclosure 28 to air intake manifold 24.

Dispersion of the alcohol vapor stream A2 causes vaporized alcohol to mix with air passing in manifold 24. The resulting air modified with the vaporized alcohol then mixes with gasoline charged into the combustion chambers of the engine 4 by the fuel injection system 12 resulting in improved economy and performance in the operation of engine 4.

The embodiments of the invention in which an exclusive property or privilege is claim are defined as follows:

1. In an improved fuel supply system for an internal combustion engine of a motor vehicle which includes an air intake manifold through which air passes to form a combustible mixture in the combustion chambers of said engine, an exhaust manifold through which combustion gases discharge from the combustion chambers of said engine and fuel charging means to charge fuel to said combustion chambers of said engine, the improvement which comprises in combination:

alcohol vaporization means, air stream means, a surge unit, a venturi unit, and an alcohol supply means, said alcohol vaporization means comprising an enclosed vessel including a lower section to hold liquid alcohol, an upper section to contain alcohol vapors, a first inlet conduit to admit liquid alcohol into said lower section, a second inlet conduit to admit a stream of air into said lower section, a first outlet conduit to discharge alcohol vapors from said upper section and control means to manage the volume of liquid alcohol contained in said vessel, said air stream means comprising a pressurized air supply device including an air inlet portion, an air outlet portion and first tubular means connecting said outlet portion to said second inlet conduit, said surge unit comprising a baffled chamber, a third inlet conduit and a second outlet conduit, said first outlet conduit being connected to said third inlet conduit for flow of vaporized alcohol from said vessel into said surge unit, said venturi unit comprising a fourth inlet conduit operatively connected to a discharge orifice positioned within said air intake manifold to discharge vaporized alcohol streamwise into said air which passes and said fourth inlet conduit extends externally of said air intake manifold for connection to said second outlet conduit for passage of vaporized alcohol streamwise from said surge unit to said orifice, said alcohol supply means comprising a tank, a third outlet conduit to discharge liquid alcohol from said tank operatively connected by third tubular means to said first inlet conduit to charge liquid alcohol from said tank into said vessel, a fifth inlet conduit into said tank and fourth tubular means connecting said fifth inlet conduit to said exhaust manifold to pressurize said tank with said combustion gases.

2. The fuel supply system of claim 1 wherein said fuel charging means comprises a carburetor.

3. The fuel supply system of claim 1 wherein said fuel charging means comprises a fuel injector system.

4. The fuel supply system of claim 1 wherein said first tubular means includes an air filter.

5. The fuel supply system of claim 1 wherein said fourth tubular means includes a check valve.

6. The fuel supply system of claim 1 said wherein pressurized air supply device is an air scoop and said first tubular means includes an air filter.

7. The fuel supply system of claim 1 wherein said third tubular means includes a fuel filter.

8. The fuel supply system of claim 1 wherein said air intake manifold includes a mass air flow sensor.

9. The fuel supply system of claim 1 wherein said exhaust manifold includes an oxygen sensor.

10. A method for improving economy and performance in the operation of an internal combustion engine of a motor vehicle which includes an air intake manifold through which air passes to form a combustible mixture in the combustion chambers of said engine, an exhaust manifold through which combustion gases discharge from the combustion chambers of said engine and fuel charging means to charge fuel to said combustion chambers of said engine, said method comprising in combination the steps:

A. providing on said motor vehicle a confined supply of alcohol,

B. pressurizing said confined supply of alcohol with said combustion gases,

C. passing a controlled stream of alcohol from said confined supply to an enclosure defining an upper zone and a lower zone to maintain a volume of said alcohol in said lower zone, D. charging a stream of air into said volume of said alcohol to vaporize a portion thereof and form vaporized alcohol in said upper zone, E. causing pressure contained within said enclosure to discharge a stream of said vaporized alcohol from said upper zone of said enclosure through conduit means into said air intake manifold, F. baffling said stream in its passage from said enclosure to said air intake manifold and G. causing said stream of said vaporized alcohol to mix with said air passing in said manifold.

11. The method of claim 10 wherein during said step C, said controlled stream of alcohol is filtered.

12. The method of claim 10 wherein said passing of said stream of alcohol from said confined supply is controlled to maintain a predetermined level of said alcohol in said lower zone of said enclosure.

13. The method of claim 10 wherein valve means prevents combustion gases to flow from said confined supply of alcohol to said exhaust manifold.

* * * * *